United States Patent [19]

Holze, Jr. et al.

[11] 3,813,006

[45] May 28, 1974

[54] REPLACEABLE WELDING TIP FOR VIBRATORY WELDING APPARATUS

[75] Inventors: Ernest P. Holze, Jr., Brewster, N.Y.; Donald R. Culp, Danbury, Conn.

[73] Assignee: Branson Instruments, Incorporated, Stamford, Conn.

[22] Filed: Feb. 2, 1973

[21] Appl. No.: 329,092

[52] U.S. Cl............... 228/1, 29/470.1, 156/73
[51] Int. Cl............................ B23k 5/20
[58] Field of Search........ 228/1; 29/470.1; 156/73, 156/580; 310/26

[56] References Cited
UNITED STATES PATENTS

| | | | |
|---|---|---|---|
| 3,038,358 | 6/1962 | Jones | 228/1 X |
| 3,088,343 | 5/1963 | Balamuth et al. | 228/1 X |
| 3,184,842 | 5/1965 | Maropis | 29/470 |
| 3,426,951 | 2/1969 | Pohlman et al. | 29/470.1 X |
| 3,752,380 | 8/1973 | Shoh | 156/73 X |

*Primary Examiner*—J. Spencer Overholser
*Assistant Examiner*—Robert J. Craig
*Attorney, Agent, or Firm*—Ervin B. Steinberg

[57] ABSTRACT

A replaceable welding tip for a vibratory high frequency welding apparatus comprises a sleeve having a plurality of ridges, each ridge including a workpiece engaging surface. The tip is clamp mounted by screw means to an antinodal region of the resonator which provides the vibratory energy to the tip. The axis of vibration of the workpiece engaging surfaces and that of the thread of the screw means are substantially parallel with each other.

11 Claims, 6 Drawing Figures

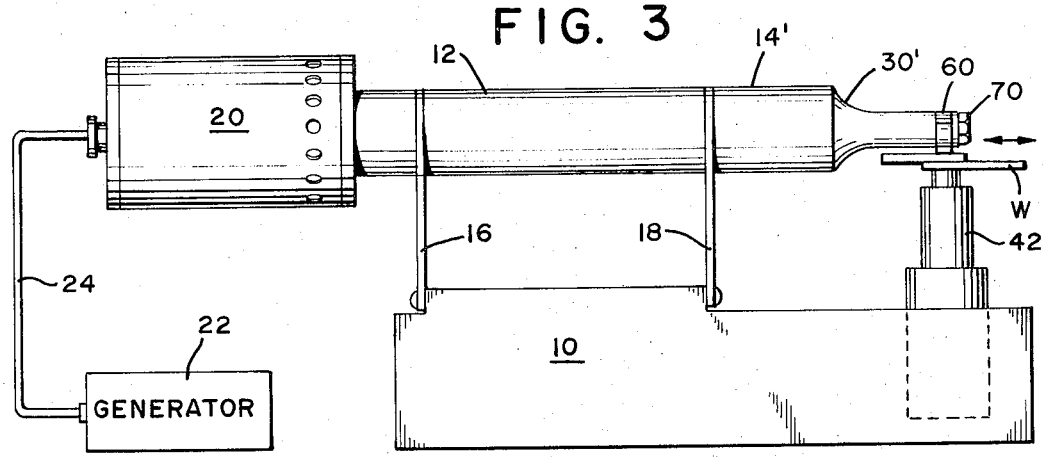
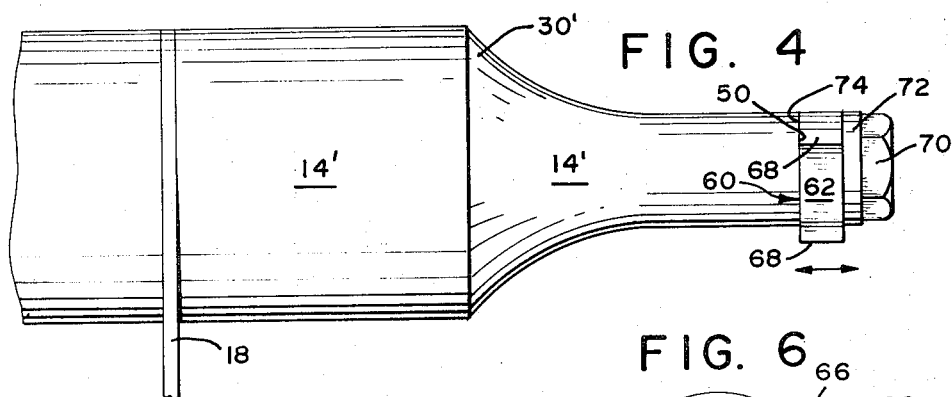
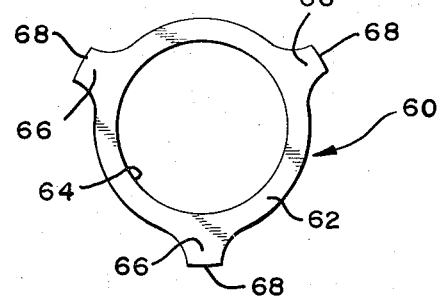
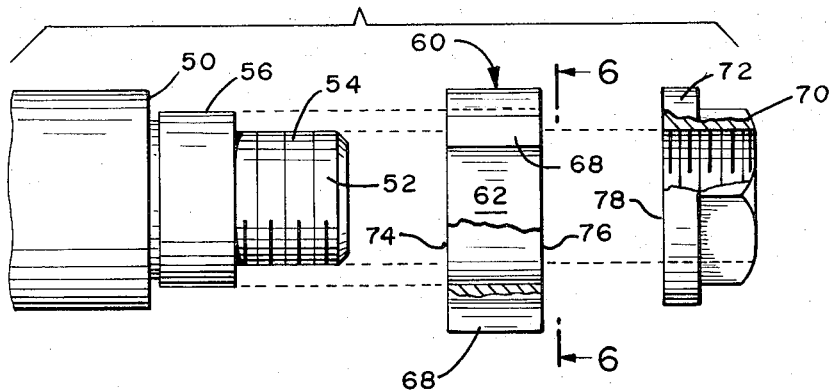

REPLACEABLE WELDING TIP FOR VIBRATORY WELDING APPARATUS

BRIEF DESCRIPTION OF PRIOR ART

This invention refers to welding apparatus as disclosed in U.S. Pat. Nos. 2,946,119 and 2,946,120 which reveal vibratory welding of metal workpieces, the weld achieved being in the form of a non-fusion bond. The method and apparatus to accomplish the joining of metal workpieces comprise means for holding the workpieces to be joined in intimate contact under a static force and applying to one of the workpieces vibratory energy in a direction substantially perpendicular to the direction of the applied force. The vibratory energy used may be in the sonic or in the ultrasonic frequency range and preferably is between 5 and 100 KHz.

More specifically, this invention concerns an improved welding tip construction which applies the vibratory energy generated to the metal workpiece and the attachment of the tip to the resonator forming a part of the welding apparatus.

It will be apparent that the tip transferring vibratory energy to the workpiece is subject to wear due to the combination of pressure and high frequency vibration. Hence, as the welding apparatus is operated in production, the tip must be replaced in the same manner as an ordinary machining tool bit or an electrical welding electrode requires frequent dressing and replacement. In the past replaceable tool tips for vibratory welding apparatus have been designed and are shown for instance in U.S. Pat. No. 3,038,358, J. B. Jones, dated June 12, 1962 or in pending application for U.S. Pat. Ser. No. 234,198 filed Mar. 13, 1972 in the name of Andrew Shoh, entitled "Vibratory Apparatus", which application is assigned to the assignee of this application. However, these prior constructions have been only moderately successful and difficulty in terms of reliability has been experienced when the apparatus were used as a production tool. Some of the shortcomings of the prior art designs may be summarized briefly as follows:

The threaded tip joint design of prior art constructions does not utilize maximum thread strength under vibration. Specifically, the thread axis is generally perpendicular to the axis of vibration, and hence, the thread is stressed in a radial direction instead of an axial direction in which a threaded joint exhibits maximum strength. The rocking of the tool tip causes wear on the sides of the thread (radial distance between root and outer diameter) and is responsible for a progressive deterioration of the thread and joint. The prior methods of attachment of the tool tip to either the resonator or the vibration transmitting member have not been adequate to handle tool tips incorporating comparatively large workpiece engaging surfaces. Some of the prior constructions require accurate radial orientation of the resonator to which the tip is attached so that the workpiece engaging tip will contact the workpiece at the proper angle. Certain prior designs, furthermore, cause an axially asymmetrical load on the resonator. Similarly, several of the previous constructions provide only a relatively small clamping area in relation to the size of the workpiece engaging tip surface and incorporate non-planar clamping surfaces which are difficult to machine and to mate with complementary surfaces.

The requirement for a good tip design involves inter alia the following considerations:

Since the workpiece engaging surface of the tip is subject to wear with usage, the tip not only must be replaceable, but the replacement procedure must be simple and must be capable of being carried out by inexperienced personnel. The method of attachment of the tip and its workpiece engaging surface to the resonator must be adequate for high vibrational amplitude operation without power loss in the joint. Heating at the joint is indicative of power loss and of mechanical motion which may result in inconsistent welding and lead to a gradual deterioration of the joint itself. The workpiece engaging surface of the tip should offer a choice of configurations and cross-sectional shapes. The tip design must lend itself to the use of large cross-sectional workpiece engaging surfaces. Also, the tip construction should be such as not to require critical resonator alignment, thereby facilitating the use of different resonators with different gains and amplitudes as may be required to provide a versatile welding apparatus. Last but not least, the tip design should be symmetrical with respect to the longitudinal axis of the resonator to exhibit a dynamically balanced condition and hence avoid undesirable modes of vibration of the resonator, that is longitudinal vibration and not flexural mode of vibration.

BRIEF SUMMARY OF THE INVENTION

The tip construction disclosed hereafter overcomes the above described shortcomings of the prior art and fulfills substantially all of the desirable characteristics listed heretofore. To this end, the tip is a sleeve adapted to be mounted to an antinodal region of the resonator. The tip has two plane end faces for being urged into abutting contact with a complementary end face of the horn, using screw means to exert the engagement pressure. A set of equidistantly spaced ridges extend in a radial direction from the body of the sleeve and each such ridge is provided with a respective peripherally disposed workpiece engaging surface. The plurality of workpiece engaging surfaces can be used in sequence as one or more of the surfaces indicates wear and is no longer useful.

Several other characteristics of this new design are important in assessing the advance provided in the art. The clamping areas of the tip disclosed herein are flat and therefore are easy to manufacture and are readily mated with complementary surfaces. Uniform clamping pressure can be provided over a large area so as to reduce stress concentration and wear. The clamping area is large in relation to the workpiece engaging surface, typically being 2 to 20, and the clamping is achieved in a secure manner even for large workpiece engaging surfaces, hence wear is minimal. The tip design is symmetrical and dynamically balanced with respect to the resonator axis. The orientation of the workpiece engaging surface is completely independent of the radial orientation of the resonator. The sleeve configuration provides for multiple workpiece engaging surfaces which may be used in sequence providing enhanced life for the tip. Replacement and alignment of the tip is easy and can be accomplished by unskilled personnel in a minimum of time. Most importantly, the thread used in attaching the tip to the resonator and providing the engagement force is utilized when performing work in the direction in which it exhibits maximum strength, that is, the axis of the thread and the axis of mechanical vibration imparted to the workpiece are parallel instead of being perpendicular to one another.

Further and still other beneficial traits of the present design will be apparent from the following description when taken in conjunction with the accompanying drawing.

BRIEF DESCRIPTION OF THE DRAWING

FIG. 3 is a side elevational view of the improved apparatus;

FIG. 4 is an enlarged view of the frontal portion of the resonator and welding tip shown in FIG. 3;

FIG. 5 is an exploded view disclosing the welding tip and its attachment to the resonator, and FIG. 6 is a plan view of the welding tip along line 6—6 in FIG. 5.

DESCRIPTION OF PRIOR ART

Figure 1:
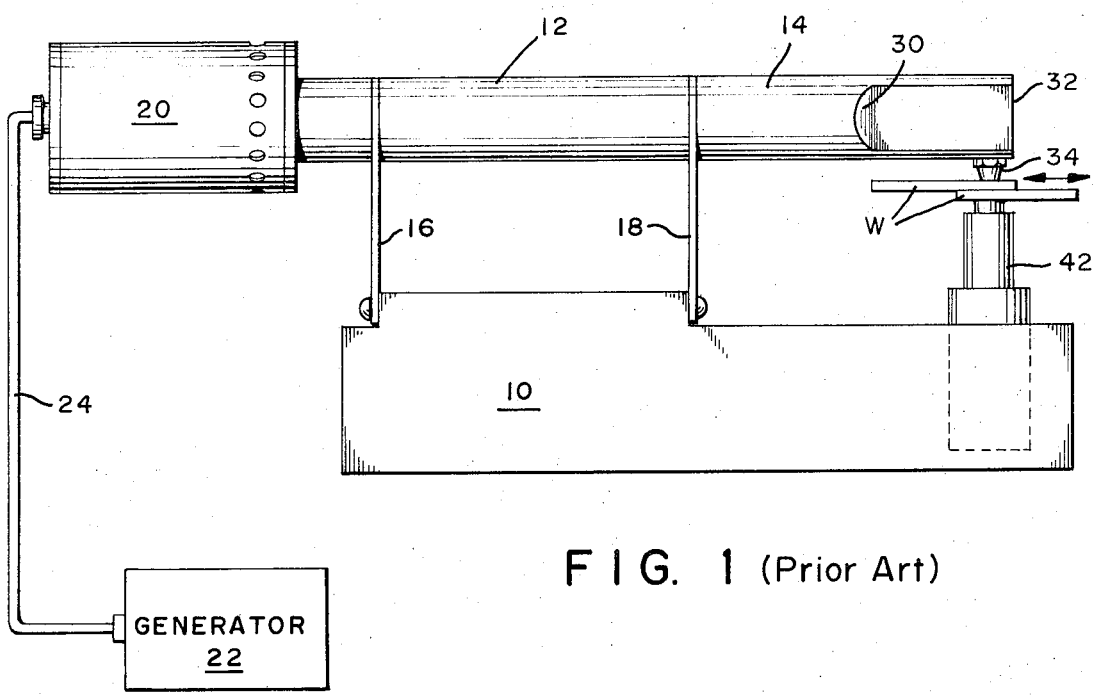
FIG. 1 is a side elevational view of a typical prior art arrangement.
Figure 2:
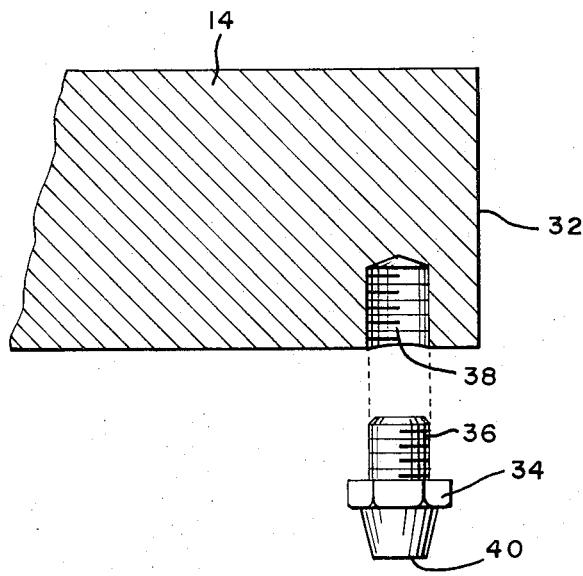
FIG. 2 is an exploded view of certain portions of the arrangement shown in FIG. 1.

Referring now to the figures and FIGS. 1 and 2 in particular, a vibratory welding apparatus as described in the patent application supra is shown. A base 10 supports an elongated resonator, also called horn, made of two parts 12 and 14 which are acoustically coupled to each other. Two flat support members 16 and 18, adapted to yield in the direction of longitudinal motion of the resonator, support the resonator in fixed position above the support 10. The support members 16 and 18 engage the resonator 12 and 14 substantially at two of its antinodal regions of longitudinal vibration.

The resonator made of metal, such as aluminum or titanium, is mechanically coupled to an electro-acoustic converter unit 20 which is connected to receive high frequency electrical energy, for instance at 10 KHz, from an electrical generator 22 via a cable 24. The converter unit by means of piezoelectric or magnetostrictive means (not shown) converts the applied electrical energy to mechanical vibrations which are applied to the resonator, causing the latter to be resonant at its predetermined frequency. A converter means suitable for the present purpose is disclosed, for instance, in U.S. Pat. No. 3,328,610 dated June 27, 1967, S. E. Jacke et al., entitled "Sonic Wave Generator,", and the design of resonators is described in "Ultrasonic Engineering" (book) by Julian R. Frederick, John Wiley & Sons, Inc., New York, N.Y. (1965) pp. 87 to 103. The resonator portion 14 is provided with a reduction in cross-section as indicated by numeral 30 for causing increased mechanical amplitude of vibration manifest at the end surface 32 which is disposed substantially at another antinodal region of longitudinal motion. The latter antinodal region of the resonator is fitted with a welding tip 34 which by means of a threaded stud 36 is assembled into a threaded, radially disposed, hole 38 of the resonator. The welding tip 34 has a workpiece engaging surface 40 for contacting a workpiece W which with its uppermost side is urged into forced contact with the tip 34 by a hydraulic ram 42.

When the converter unit 20 is energized, the tip 34 undergoes mechanical vibration in a direction as shown by the double headed arrow. It will be noted that the tip 34 will be subjected to wear as the result of its forced engagement with the workpiece and the vibrations applied and, hence, the tip needs to be replaced periodically. Moreover, since the thread axis is disposed perpendicular to the axis of vibratory motion the thread supporting the tip is stressed in a sideways direction, force being applied alternatingly from one side and then from the other. Additionally, the screw attachment does not lend itself to provide predetermined orientation of the surface 40 relative to the direction of vibration effected upon the workpiece. Also, as stated heretofore, the tip configuration and its attachment to the resonator cause a dynamically unbalanced condition for the resonator and are afflicted, still further, with the shortcomings previously recited.

DESCRIPTION OF PREFERRED EMBODIMENT OF INVENTION

A preferred embodiment of the present invention is disclosed in FIGS. 3 to 6. Items corresponding to those previously described in conjunction with FIGS. 1 and 2 are identified by identical reference numerals. The frontal portion 14' of the resonator is of cylindrical cross-section with a reduction of cross-section occurring at 30'. The frontal end of the resonator is constructed to exhibit a flat radially disposed annular surface 50, FIG. 5, from which a stud 52 provided with a male thread 54 extends. Between the surface 50 and the threaded portion 54 of the stud there is disposed a cylindrical shoulder 56.

The welding tip 60 is a substantially cylindrical sleeve and comprises a sleeve body 62, FIG. 6, having a centrally disposed aperture 64 dimensioned to snugly fit over the shoulder 56 of the stud 52. Three equidistantly spaced discrete ridges 66 extend radially outward from the body 62 and each ridge 66, forming a unitary part of the body, exhibits a respective peripherally disposed workpiece engaging surface 68. The tip 60 is assembled upon the resonator by sliding it with its aperture 64 over the shoulder 56 and then threading the internally threaded nut 70, having an integral flanged portion 72, upon the thread 54. While tightening the nut 70 upon the stud, one of the workpiece engaging surfaces 68 is manually oriented by rotation until it is in the desired workpiece engaging position. Tightening the nut 70 forces the face 74 of the welding tip 60 into abutting engagement with the radial surface 50, and the other parallel face 76 of the welding tip into engagement with the radial surface 78 of the nut 70.

If wear occurs at the selected workpiece engaging surface 68, the nut 70 is loosened and the top 60 is rotated until the next workpiece engaging surface 68 is suitably indexed relative to the workpiece W. While three workpiece engaging surfaces 68 have been shown it will be apparent that two, four or more of such surfaces may be provided. If the ridges 66 are equidistantly spaced and of equal configuration, the tip 60 is dynamically balanced. Moreover, the welding tip represents only a relatively small mass in relation to the resonator assembly typically 1/25 to 1/100 and in no way affects the dynamic condition of the resonator.

It should be noted, moreover, that the thread 54, as contrasted with the prior design, is stressed in the direction in which it exhibits maximum strength. Specifically, the thread axis and the direction of vibration of the workpiece engaging surface of the welding tip relative to the workpiece are parallel with each other. This condition eliminates the sideways thrust experienced heretofore. Furthermore, the welding tip can be oriented radially at any angle and in a completely independent manner, that is, orientation of the resonator is not affected. In addition, the desired characteristics enumerated in part heretofore are met by this relatively simple and inexpensive welding tip design.

It will be apparent, furthermore, that the workpiece engaging surfaces 68 can be shaped to assume the particular contour of the workpiece. For instance, the workpiece engaging surfaces do not need to be flat or curved, but may be grooved to receive a wire, or contoured in other configurations as dictated by the workpiece portion to be contacted.

While the welding tip 60 has been described herein as being of sleeve configuration, it will be obvious to those skilled in the art that if the workpiece engaging surface is shorter, the sleeve may be shortened as well, assuming a ring or washer-like configuration. These latter constructions as used herein shall be comprehended by the term "sleeve".

What is claimed is:

1. In a vibratory welding apparatus the combination of:
   an elongated resonator dimensioned to be resonant along its longitudinal axis at a predetermined frequency of vibration having two ends;
   means coupled to said resonator at one end thereof for imparting vibrations of said predetermined frequency to said resonator and causing said resonator when resonant to exhibit at least two antinodal regions and one nodal region of longitudinal vibration;
   a replaceable welding tip in the form of a sleeve having two radially disposed end faces, said sleeve having a mass not exceeding one twenty-fifth of that of said resonator;
   screw means detachably clamping one of said faces of said sleeve in abutting engagement with a complementary radial surface disposed substantially at the other end of said resonator, and
   a ridge forming a unitary part of said sleeve radially extending from said sleeve and provided with a peripheral workpiece engaging surface adapted to impart vibratory energy to a workpiece in forced contact with said peripheral surface, the axis of vibration of said workpiece engaging surface relative to the workpiece responsive to said resonator being resonant being substantially parallel to the thread axis of said screw means.

2. In a vibratory welding apparatus as set forth in claim 1, a plurality of ridges extending from said sleeve, each ridge having a respective peripheral workpiece engaging surface.

3. In a vibratory welding apparatus as set forth in claim 2, said plurality of ridges being equidistantly spaced about the center of said sleeve and being of substantially identical configuration for exhibiting a dynamically balanced condition to said resonator.

4. In a vibratory welding apparatus as set forth in claim 2, said screw means comprising an internally threaded nut mating with a threaded stud extending from the other end of said resonator.

5. In a vibratory welding apparatus as set forth in claim 2, the other end of that resonator being disposed substantially at an antinodal region of longitudinal vibration.

6. In a vibratory welding apparatus as set forth in claim 2, the other end of said resonator being located substantially at an antinodal region of said resonator and including a shoulder and a threaded stud extending from the other end, said sleeve having a centrally disposed aperture dimensioned to snugly slide over said shoulder.

7. In a vibratory welding apparatus as set forth in claim 6, said radially disposed faces being disposed in parallel planes, and said screw means engaging the other one of said faces.

8. In a vibratory welding apparatus as set forth in claim 2, said resonator being dimensioned for being resonant at a frequency in the range between 5 and 100 KHz.

9. In a vibratory welding apparatus the combination of:
   an elongated resonator dimensioned to be resonant along its longitudinal axis at a predetermined frequency of vibration having two ends;
   electro-acoustic transducer means coupled to said resonator at one end thereof for imparting vibrations of said predetermined frequency to said resonator and causing said resonator when resonant to exhibit at least two antinodal regions and one nodal region of longitudinal vibration;
   support means coupled to said resonator for supporting said resonator and transducer means in stationary position;
   a replaceable welding tip in the form of a sleeve having two radially disposed end faces said sleeve having a mass not exceeding one twenty-fifth of the mass of resonator;
   screw means detachably clamping one of said faces of said sleeve in abutting contact with a complementary radial surface disposed substantially at the other end of said resonator;
   a plurality of discrete ridges forming a unitary part of said sleeve radially extending from said sleeve, each ridge provided with a respective peripherally disposed workpiece engaging surface adapted to impart vibratory energy to a workpiece in forced contact therewith, the direction of vibration of said workpiece engaging surface responsive to said resonator being resonant being substantially parallel to the thread axis of said screw means, and
   said screw means mounting and clamping said sleeve in such a manner that responsive to indexing said sleeve relative to said other end a selected one of said peripherally disposed surfaces is mounted for engaging a workpiece.

10. In a vibratory welding apparatus as set forth in claim 9, the other end of said resonator being disposed substantially at an antinodal region of longitudinal vibration.

11. In a vibratory welding apparatus as set forth in claim 10, the other end of said resonator including a shoulder and a threaded stud extending therefrom, said sleeve having a central aperture dimensioned for slidably fitting over said shoulder, and said screw means including a threaded nut adapted to mate with said stud and upon being tightened clamping said sleeve with its face in said abutting contact.

* * * * *